Patented Apr. 28, 1925.

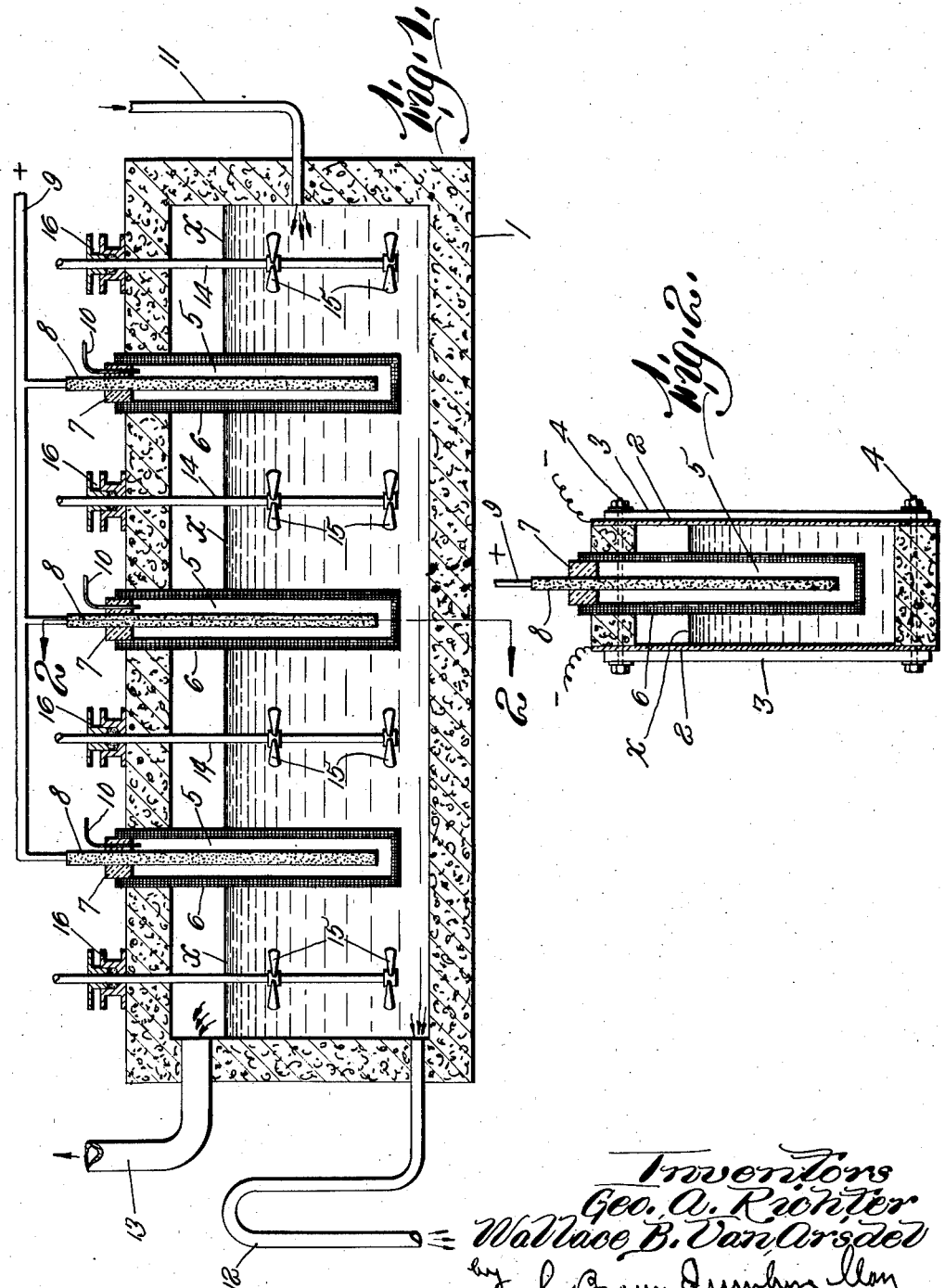

1,535,378

UNITED STATES PATENT OFFICE.

GEORGE A. RICHTER AND WALLACE B. VAN ARSDEL, OF BERLIN, NEW HAMPSHIRE, ASSIGNORS TO BROWN COMPANY, OF BERLIN, NEW HAMPSHIRE, A CORPORATION OF MAINE.

MANUFACTURE OF CHLOROFORM.

Application filed October 14, 1921. Serial No. 507,750.

*To all whom it may concern:*

Be it known that we, GEORGE A. RICHTER and WALLACE B. VAN ARSDEL, both citizens of the United States, residing at Berlin, in the county of Coos and State of New Hampshire, have invented new and useful Improvements in the Manufacture of Chloroform, of which the following is a specification.

This invention relates to the manufacture of chloroform by the reduction of carbon tetrachloride with nascent hydrogen.

Heretofore this has been accomplished at room temperature by the action of metals and dilute acid or metals and water.

According to the present invention, the reduction of the carbon tetrachloride is accomplished with hydrogen liberated by electrolytic decomposition. Since carbon tetrachloride is not an electrolyte, we have discovered that this can be accomplished by utilizing an electrolyte with which the carbon tetrachloride is miscible or with which it may form an emulsion, so that the carbon tetrachloride may be brought into intimate contact with the electrode at which hydrogen is liberated in a nascent condition.

In such case, the carbon tetrachloride is confined in the cathode compartment of an electrolytic cell, and is preferably emulsified in an acid solution of substantially or nearly the same density, so as to lessen the tendency of the liquids to separate. For example, an electrolyte consisting of a concentrated aqueous solution of zinc chloride and hydrochloric acid may be employed, but, in lieu thereof, any other solution of a salt or an acid may be employed in which the carbon tetrachloride may be readily emulsified. In practice, we have employed a 50% zinc chloride solution to which 5% by volume of concentrated hydrochloric acid is added, since carbon tetrachloride may be easily maintained in emulsion therein by moderate stirring.

For the purpose of this process, one may employ an electrolytic cell, such as illustrated by the accompanying drawing, on which—

Figure 1 represents the cell in vertical longitudinal section, and

Figure 2 represents the same in vertical transverse section.

The cell comprises an acid-proof frame or cell body 1, the open sides of which are closed by lead cathode plates 2, secured in place by suitably spaced clamp bars 3, and bolts 4 which are passed laterally through the top and bottom walls of the cell. Within the cell and projecting downwardly through the top portion, there are anode chambers 5 formed of porous alundum cups 6, the upper ends of which are fastened in the upper wall of the cell body and glazed with sodium silicate. The upper ends of the cups are closed by suitable members or closures 7 through which anodes 8 are passed for electrical connection with the positive conductor 9. Through each closure 7 there leads a pipe 10 for conducting away the gases evolved at the anodes, these pipes all being connected to a suitable main not shown. Where a solution such as herein described is employed, these anodes may consist of graphite bars. The electrolyte is supplied to the cell body through a feed pipe 11, the feed of the electrolyte being regulated by any suitable means as ordinarily, so that it may be delivered to the cell as needed. At 12 we have indicated a goose-neck overflow pipe for conducting away the lower stratum of liquid from the cell. We have also indicated at 13 a gas main for conducting away the excess hydrogen from above the body of the electrolyte, the level of which is indicated at $x$. At suitable intervals we employ agitators, each of which may consist of a shaft 14 having agitators or propellers 15. The shafts extend upwardly through stuffing boxes 16 located on the upper wall of the cell through which the shafts project, and these shafts are all rotated by any suitable form of power-transmitting mechanism. It will be understood, of course, that the shafts and their agitators must be made of material which is acid-proof. The cell body itself may be made of acid-proof concrete or stoneware. In this construction, the cathode chamber is formed by the body of the cell and the side plates or cathodes of lead, and is separated by the porous cups from the anode chambers.

In operation, the cell is supplied with a proper quantity of the electrolyte, to which is added carbon tetrachloride, the electrolysis being carried on at ordinary temperatures, although if necessary the cell may be cooled. The agitators serve to produce a very finely divided emulsion of the carbon tetrachloride as the disperse phase of the emulsion, so that minute particles of the carbon tetrachloride are brought into intimate contact with the cathodes. The reaction proceeds substantially as follows:

$$2HCl = 2H + 2Cl$$
$$CCl_4 + 2H = CHCl_3 + HCl$$

It is unlikely that the zinc chloride enters into the reaction. This is due to the fact that the voltage of the electric current is insufficient to permit the decomposition of the zinc chloride in the strongly acid solution. While in the operation a certain quantity of the acid is reformed by the reduction of the carbon tetrachloride, the net acidity of the solution diminishes; and, to compensate therefor, the electrolyte is restored to the desired acid strength as needed, or as a part of the recovery process. The zinc chloride content remains substantially or sensibly constant.

It is found to be desirable to convert not over 10% to 15% of the tetrachloride to chloroform in one operation, in which case the operation of the agitators is stopped, and, after the emulsion is allowed to separate, the layer containing the remaining tetrachloride and the chloroform are separated from the remainder of the electrolyte. The liquid thus withdrawn is subjected to distillation to remove the chloroform, after which the remaining carbon tetrachloride may be again returned to the cell. By carrying the conversion on only to this extent, the formation of undesirable secondary products is negligible.

The excess hydrogen, which escapes through the outlet 13, entrains therewith more or less carbon tetrachloride and chloroform which may be condensed out and then distilled for the recovery of the chloroform. The chlorine, which is liberated at the anodes, may be recovered and used for any suitable purposes.

Instead of carrying on an intermittent electrolytic operation as herein described, the mixture of electrolyte and carbon tetrachloride may be fed slowly into the cell and the bottom layer of the contained liquid may be slowly withdrawn, in which case the chloroform is to be recovered therefrom by distillation.

What we claim is:—

1. A process of making chloroform by the reduction of carbon tetrachloride with hydrogen, which comprises emulsifying carbon tetrachloride as the disperse phase in a heavy salt solution of substantially the same density as carbon tetrachloride and containing an acid, passing an electric current from an electrode through the solution to decompose the acid and liberate nascent hydrogen in the presence of the dispersed carbon tetrachloride, and recovering chloroform thereby produced.

2. A process of making chloroform by the reduction of carbon tetrachloride with hydrogen, which comprises emulsifying carbon tetrachloride as the disperse phase in a 50% zinc chloride solution containing concentrated hydrochloric acid, passing an electric current from an electrode through the solution to decompose the acid and liberate nascent hydrogen in the presence of the dispersed carbon tetrachloride, and recovering chloroform thereby produced.

3. A process of making chloroform, which comprises emulsifying carbon tetrachloride in an aqueous electrolyte comprising an acid and zinc chloride, electrically decomposing the acid of the electrolyte to liberate nascent hydrogen in the presence of the emulsified carbon tetrachloride to reduce the same to chloroform, and separating and recovering the chloroform thereby produced.

4. A process of making chloroform, which comprises emulsifying carbon tetrachloride as the disperse phase in an aqueous electrolyte having approximately the same density as the carbon tetrachloride, passing an electric current through such electrolyte to an electrode to liberate nascent hydrogen at such electrode in the presence of the carbon tetrachloride phase of the emulsion, thereby reducing such carbon tetrachloride and producing chloroform, separating the chloroform and remaining carbon tetrachloride from the electrolyte, and separating and recovering the chloroform from such carbon tetrachloride.

5. A process of making chloroform, which comprises stirring carbon tetrachloride in an aqueous salt solution of substantially the same density to produce an emulsion in which the carbon tetrachloride constitutes the disperse phase, passing an electric current through the emulsion, during the stirring thereof, to an electrode to decompose the electrolyte and liberate nascent hydrogen in contact with particles of the carbon tetrachloride and thereby reduce such particles to chloroform, and recovering chloroform from the electrolyte.

6. A process of making chloroform, which comprises stirring carbon tetrachloride in an aqueous salt solution of substantially the same density to produce an emulsion in which the carbon tetrachloride constitutes the disperse phase, passing an electric current through the emulsion, during the stirring thereof, to an electrode to decompose the electrolyte and liberate nascent hydrogen in contact with particles of the carbon tetrachloride and thereby reduce such particles to chloroform, ceasing the stirring action when from ten to fifteen per cent of the carbon tetrachloride has been reduced to chloroform, and permitting such chloroform and the remaining carbon tetrachloride to settle, separating the chloroform and carbon tetrachloride from the electrolyte, and separating and recovering the chloroform.

7. A process of making chloroform, which comprises emulsifying carbon tetrachloride in an electrolyte consisting of the mixture of hydrochloric acid and a solution of the chloride of a heavy metal, passing an electric current through the emulsion to an electrode to decompose the electrolyte and liberate nascent hydrogen in contact with the particles of carbon tetrachloride and thereby to reduce such particles to chloroform, and then recovering the chloroform so produced.

8. A process of making chloroform which comprises emulsifying carbon tetrachloride in an electrolyte consisting of an acid and a solution of the chloride of a heavy metal, passing an electric current through the emulsion to an electrode to decompose the electrolyte and liberate nascent hydrogen in excess in contact with the particles of the carbon tetrachloride and thereby to reduce such particles to chloroform, and recovering vaporized carbon tetrachloride and chloroform escaping with the excess hydrogen.

In testimony whereof we have affixed our signatures.

GEORGE A. RICHTER.
WALLACE B. VAN ARSDEL.